United States Patent
Hecht

(10) Patent No.: US 6,783,068 B2
(45) Date of Patent: Aug. 31, 2004

(54) LARGE DEPTH OF FIELD LINE SCAN CAMERA

(75) Inventor: Kurt Hecht, Hartsville, PA (US)

(73) Assignee: Accu-Sort Systems, Inc., Hatfield, PA (US)

( * ) Notice: Subject to any disclaimer, the term of this patent is extended or adjusted under 35 U.S.C. 154(b) by 0 days.

(21) Appl. No.: 10/251,394

(22) Filed: Sep. 20, 2002

(65) Prior Publication Data

US 2003/0019930 A1 Jan. 30, 2003

Related U.S. Application Data

(63) Continuation of application No. PCT/US01/09058, filed on Mar. 21, 2001.
(60) Provisional application No. 60/190,796, filed on Mar. 21, 2000.

(51) Int. Cl.[7] .................................................. G06K 7/00
(52) U.S. Cl. .................................. 235/435; 235/462.22
(58) Field of Search .................. 235/462.14, 462.22, 235/462.23, 462.32, 462.42, 435, 437, 459

(56) References Cited

U.S. PATENT DOCUMENTS

| | | |
|---|---|---|
| 5,032,022 A | 7/1991 | Sato et al. |
| 5,426,288 A * | 6/1995 | Obata et al. ............ 235/462.14 |
| 5,483,051 A * | 1/1996 | Marchi .................. 235/462.01 |
| 5,633,487 A | 5/1997 | Schmutz et al. |
| 5,661,561 A | 8/1997 | Wurz et al. |
| 6,325,289 B1 * | 12/2001 | Mazzone ............... 235/462.14 |

* cited by examiner

Primary Examiner—Daniel St. Cyr
(74) Attorney, Agent, or Firm—Volpe and Koenig, P.C.

(57) ABSTRACT

A scanning system utilizes a randomly addressable image sensor which is selectively positioned at the Scheimpflug angle in the image plane in order to detect focused light reflected from an object. Light reflected from the object is focused onto the sensor through an objective lens. Since the sensor is mounted at the Scheimpflug angle, each strip within the depth of field of the object plane has corresponding pixels on the sensor which are in focus.

12 Claims, 9 Drawing Sheets

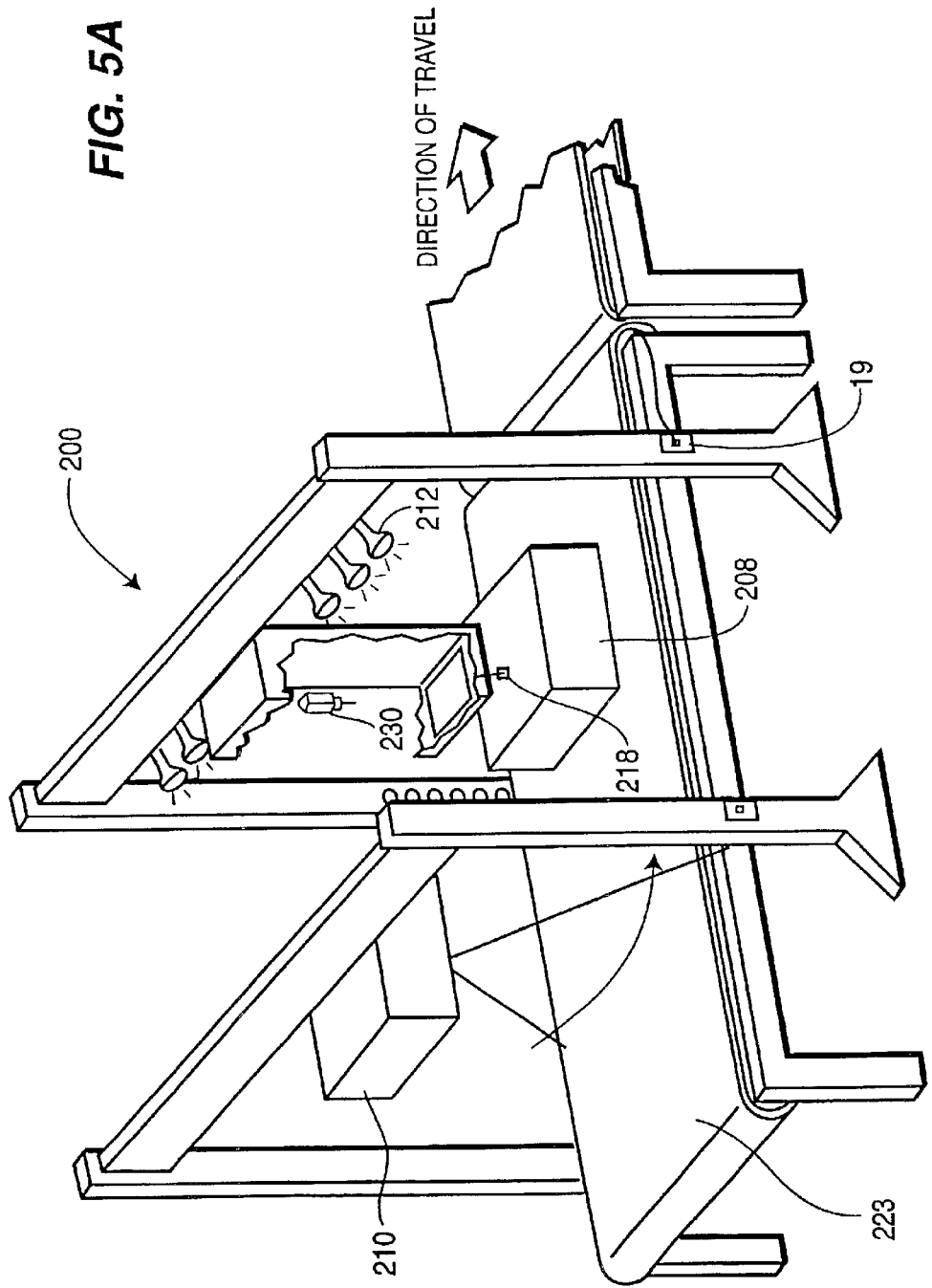

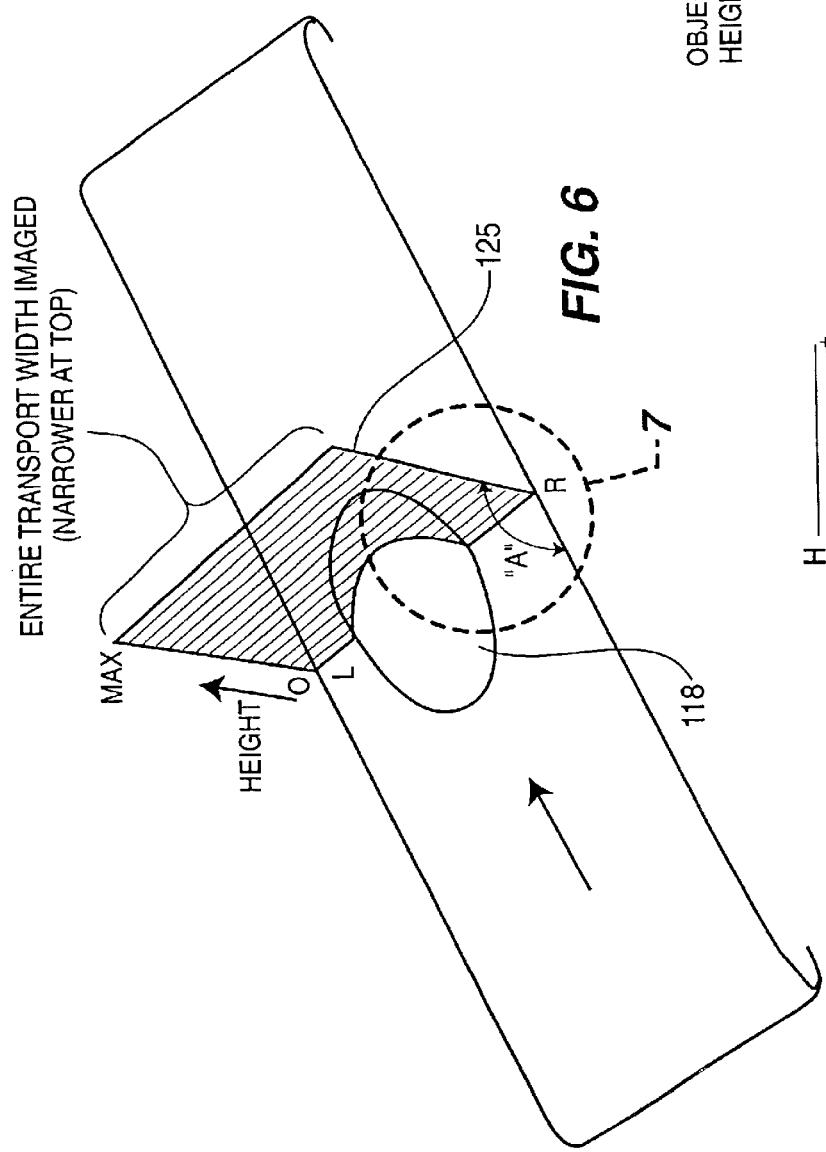
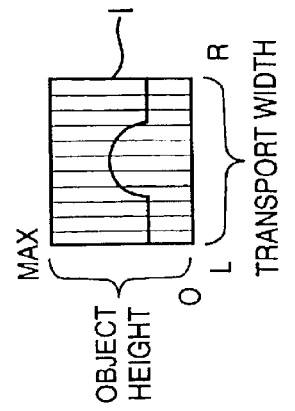
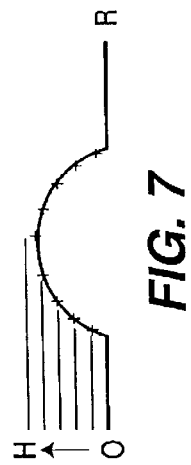
FIG. 6
FIG. 7
FIG. 8

LARGE DEPTH OF FIELD LINE SCAN CAMERA

CROSS-REFERENCE TO RELATED APPLICATIONS

This application is a continuation of PCT/US01/09058, filed Mar. 21, 2001, which claims the benefit of U.S. Provisional application No. 60/190,796, filed Mar. 21, 2000.

BACKGROUND

The present invention relates generally to optical scanning systems. More particularly, this invention relates to a scanning system having a large depth of field which is capable of focusing on and scanning a plurality of targets over a wide range of distances.

Coded symbologies are being used in a vast array of applications. The ability to track a large amount of items quickly and efficiently has led coded symbologies to be used in applications such as retail checkout, warehousing, inventory control and document tracking. As the volume of items tracked by coded symbologies has increased, the need for optical scanners which operate at high speeds has likewise increased.

Various optical scanning systems have been developed for reading and decoding coded symbologies. Such optical scanning systems typically incorporate a non-coherent light source and a light detecting means, such as a CMOS- or CCD-based image sensor. A portion of the light which is reflected from the coded symbology is detected by the image sensor and converted into an electrical signal, which is the basis for the digital image of the coded symbology that has been scanned. The digital image is then processed and decoded according to the specific type of coded symbology.

One disadvantage with all current CMOS- and CCD-based scanning systems is that they require a mechanical focusing apparatus in order to focus the light reflected from the coded symbology onto the image sensor. Since a mechanical focusing apparatus typically operates slower than the image sensor and other electronics within the scanner, the focusing apparatus tends to be the limiting factor in the speed of operation of the scanning system. Although there are scanning systems that are available which do not require a moveable focusing apparatus, these scanning systems typically have a very small depth of field.

Accordingly, there exists a need for an efficient and inexpensive scanning system that can accurately read and decode coded symbologies over a large depth of field without requiring a moving mechanical apparatus to focus light on the image sensor.

SUMMARY

The present invention is a scanning system which utilizes a randomly addressable CMOS area array sensor which is selectively positioned at the Scheimpflug angle in the image plane in order to detect focused light reflected from an object. Light reflected from the object is focused onto the CMOS area array sensor through an objective lens. Since the CMOS area array sensor is mounted at the Scheimpflug angle, each strip within the depth of field of the object plane has a corresponding string of pixels on the CMOS area array sensor which are in focus. The system may include a means for determining the distance between the scanner and the object. Once the distance between the scanner and the object is determined, the system reads out only those pixels which are in focus.

Objects and advantages will become apparent to those skilled in the art after reading the detailed description of a presently preferred embodiment.

BRIEF DESCRIPTION OF DRAWINGS

FIG. 5A is an alternative embodiment of the coded symbology scanning system of the present invention.

FIG. 6 is a perspective view of an object in the object plane being scanned.

FIG. 7 is a cross sectional view of the same object of FIG. 6 as seen in the image plane.

FIG. 8 is a view of the object as detected by the CMOS area array sensor.

DETAILED DESCRIPTION OF THE PREFERRED EMBODIMENT(S)

Figure 1:
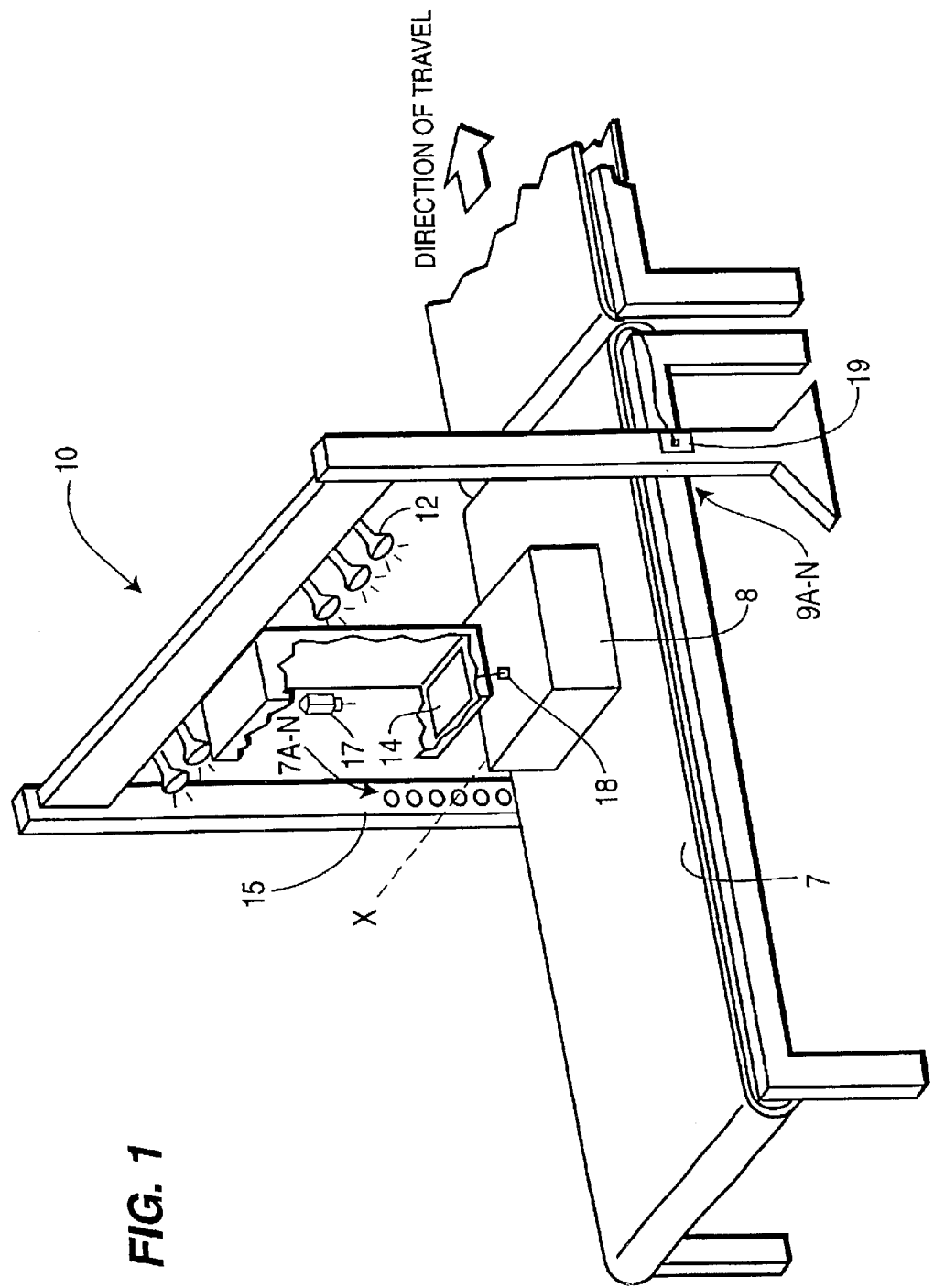
FIG. 1 is a coded symbology scanning system made in accordance with the present invention.

The present invention will be described with reference to the drawing figures wherein like numerals represent like elements throughout.

Referring to FIG. 1, a scanning system 10 made in accordance with the present invention is shown. The scanning system 10 is able to scan any type of object. For simplicity, however, the scanning system 10 will be explained with reference to scanning a coded symbology, and in particular a bar code symbol. The scanning system 10 includes a light source 12, a light curtain 15 and a camera 17 located within a housing 14. In the preferred embodiment of the present invention, the camera 17 includes a randomly addressable CMOS-based area array image sensor. However, those skilled in the art should know that any randomly addressable image sensor may be utilized without departing from the spirit and scope of the present invention.

The light source 12 facilitates detection of a subject bar code symbol 18 by illuminating the bar code symbol 18 located on an object 8. Although the light source 12 in FIG. 1 is shown as a non-coherent light source, in the present embodiment the light source 12 may compromise any type of coherent or non-coherent illumination means. Preferably, the object 8 is supported by a moving transport system 7. The scanning system 10 is aligned such that light reflected from the bar code symbol 18 passes through the front of the housing 14 and is detected by the camera 17. As will be explained in detail hereinafter, the rows of the area array sensor within the camera 17 are optically aligned parallel to the surface of the transport system 7 and perpendicular to the motion of the transport system 7. It should be recognized by those skilled in the art that FIG. 1 is illustrative only and is not drawn to scale.

The first embodiment will be described as including a light curtain 15. However, it should be recognized by those of skill in the art that any mechanism for detecting the height of an object 8, such as a proximity sensor, dimensioning system or the like, may also be utilized. Further, although the first embodiment requires the use of a light curtain 15 as a height detection means, at least one alternative embodiment, as will be described herein, does not require the use of a light curtain 15 or any other height detection means.

The light curtain 15 includes a plurality of light sources $7_{a-n}$ and a plurality of corresponding detectors $9_{a-n}$ located on the opposite side of the transport system 7 from the light sources $7_{a-n}$. As those skilled in the art would clearly recognize, as the object 8 is conveyed along the transport system 7 it blocks at least one of the light beams emanating from the light sources $7_{a-n}$ from being detected by its corresponding detector $9_{a-n}$. The absence of such light is detected by the light detectors $9_{a-n}$. Depending upon the number of light beams that have been blocked, the light curtain 15 can determine the instantaneous height x of the object 8. This information is provided to the scanning system 10 and is utilized as will be explained in detail hereinafter.

A tachometer 19 monitors the speed of the surface of the transport system 7 and the object 8, and provides this information to a processor 32 (shown in FIG. 2) to control the read-out rate of the CMOS area array sensor 16. Those skilled in the art should know that there are several other methods of monitoring the speed of the transport system 7 and the object 8 and providing this information to the processor 32 to control the read-out rate of the array that may be used as well.

Figure 2:
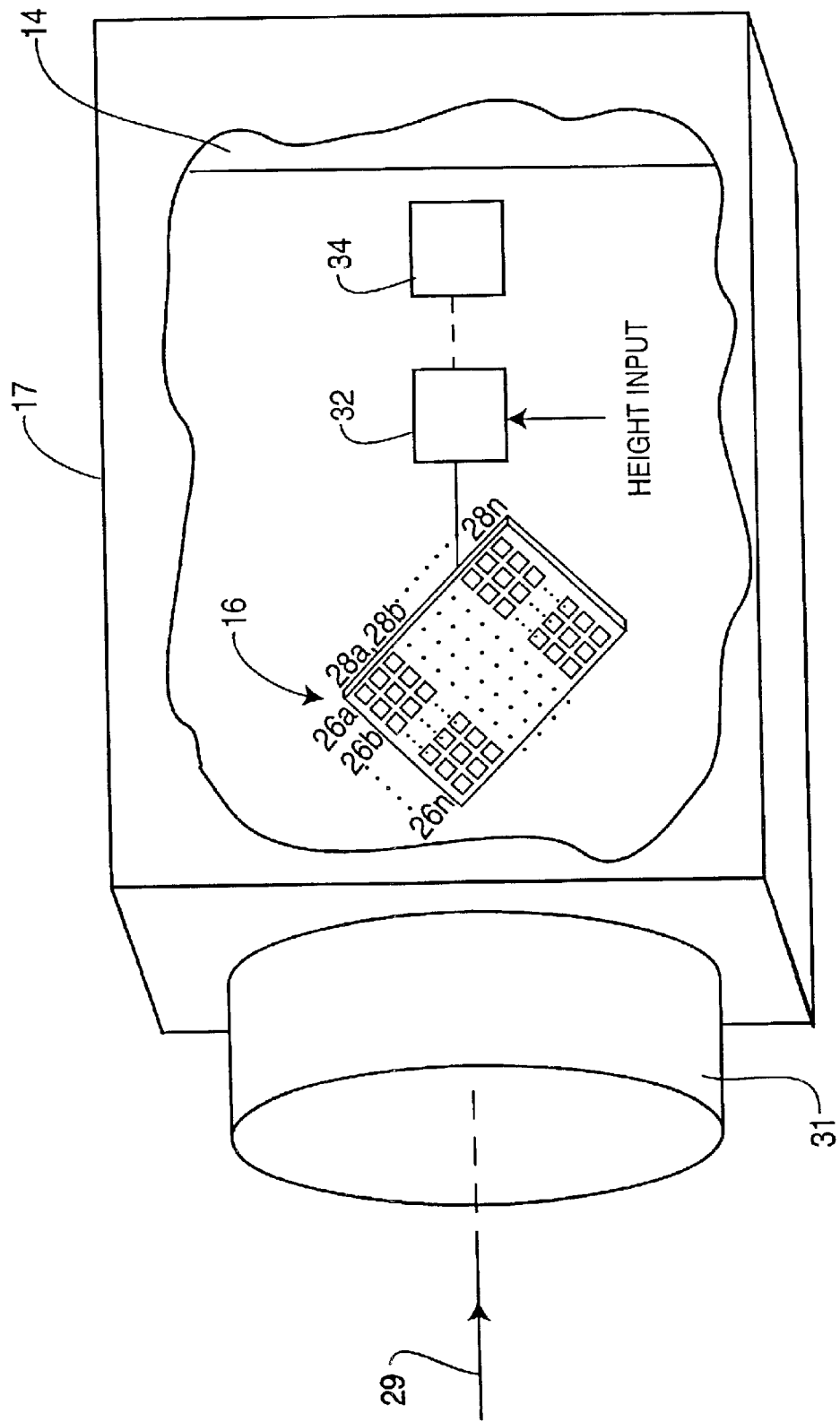
FIG. 2 is the camera made in accordance with the present invention.

Referring to FIG. 2, the camera 17 includes fixed focusing optics 31, a randomly addressable CMOS area array sensor 16, a processor 32 and an output means 34. The CMOS area array sensor 16 includes a plurality of rows of pixels $26_a$–$26_n$ and a plurality of columns of pixels $28_a$–$28_n$. As is well understood by those skilled in the art, light 29 reflected from the object 8 enters the camera 17 via the focusing optics 31. The focusing optics 31 focus the light 29 onto the CMOS area array sensor 16. The CMOS area array sensor 16 detects the reflected light 29 and each pixel within the CMOS area array sensor 16 converts the incident light energy into a stored electrical charge, and ultimately an electrical signal. The electrical signal comprises a value which represents the amount of light detected by a pixel. If the pixel's analog signal is digitized to have eight-bit resolution, the number of gray scale levels will be 255 ($2^8$-1).

The information stored within the CMOS area array sensor 16 eventually results in a digitally quantized image of the object within the field of view of the camera 17. It should be appreciated by those skilled in the art that the current randomly addressable CMOS area array sensors contain greater than 800 columns and 600 rows. This resolution, though, is certain to increase as the technology advances. The rows $26_a$–$26_n$ or columns $28_a$–$28_n$ of the CMOS area array sensor 16 can be considered a series of parallel lines when projected into the object plane. Each pixel in any specific column $28_a$–$28_n$ will have a corresponding unique focus point in the object plane due to the CMOS area array sensor 16 being positioned at the Scheimpflug angle in the image plane. The system 10 of the present invention utilizes the addressability and selective positioning of the CMOS area array sensor 16, and inputs from the light curtain 15 and the tachometer 19 in order to selectively read out information pertaining to the objects within the depth of field that are in focus.

A processor 32 receives the time sampled height data from the light curtain 15, and object motion velocity information from the tachometer 19 (shown in FIG. 1), and selectively accesses pixels within the CMOS area array sensor 16 to obtain the desired information. This information is then output to the output means 34 for further processing. The output means 34 may be a digital display, an image processing system, a positioning system, or any other type of system that will accept an output from an imaging camera.

Figure 3A:
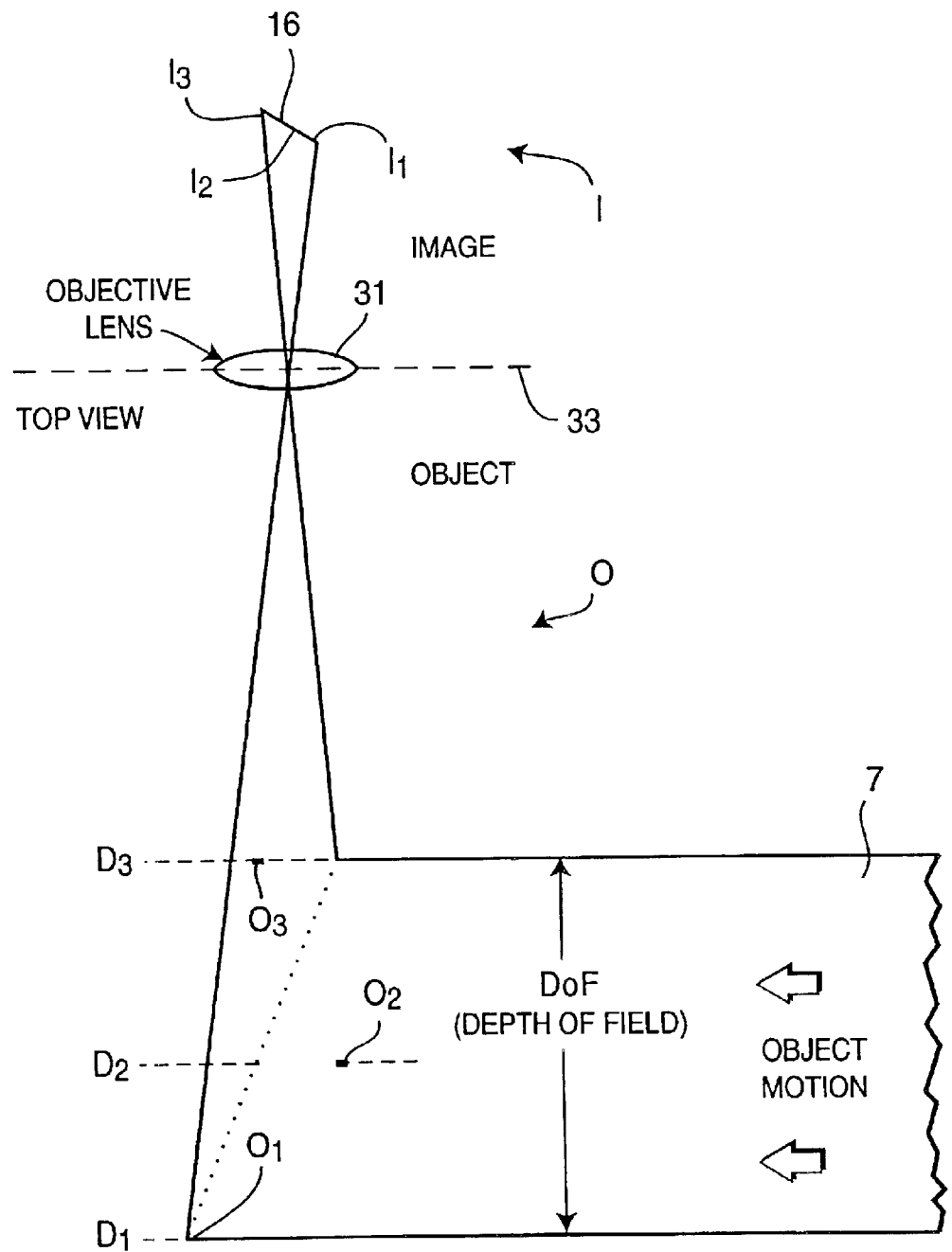
FIG. 3A illustrates the image of an object in the image plane relative to the position of the object in the object plane.

In the first embodiment of the present invention shown in FIG. 3A, the CMOS area array sensor 16 is tilted at an angle with respect to the median plane 33 through the optics 31. The angle of tilt, (hereinafter, the Scheimpflug angle), is determined using the Scheimpflug condition. The Scheimpflug angle is dependent on the focal length of the optics 31 and the desired working range defining the depth of field (DOF) in object space. The CMOS area array sensor 16 must be positioned such that an object positioned within the DOF is imaged in focus onto the active portion of the CMOS area array sensor 16. Those skilled in the art know that the Scheimpflug angle may be calculated using the following relationship (i.e. the Scheimpflug condition):

$$\frac{1}{f} = \frac{1}{s} + \frac{1}{s'} \qquad \text{Equation 1}$$

where f equals the focal length of the optics, s equals the distance from the optics 31 to the object 8, and s' equals the corresponding distance from the optics 31 to the image plane I, where a string of pixels on the CMOS area array sensor 16 is in focus. This relationship provides that each horizontal line in the object plane O has a corresponding horizontal line in the image plane I which is in focus. For example, each row $26_a$–$26_n$ in the CMOS area array sensor 16 in the image plane I corresponds to a specific distance in the object plane O; and each such distance in the object plane O corresponds to a line parallel to the surface of transport system 7 and perpendicular to the direction of motion of the transport system 7.

Figure 3B:
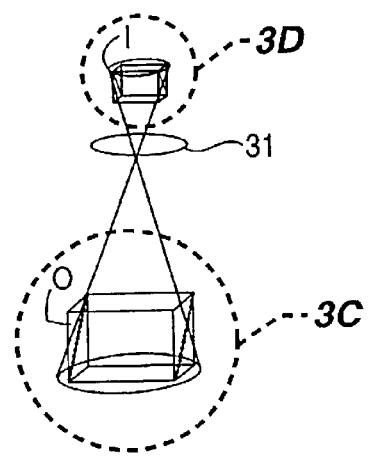
FIG. 3B shows the spatial relationship between the object plane, the optics and the image plane.
Figure 3D:
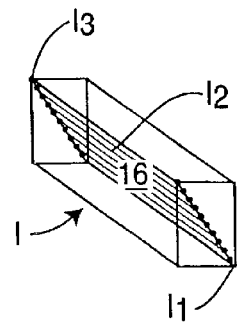
FIG. 3D shows the image plane of FIG. 3B in greater detail.
Figure 3C:
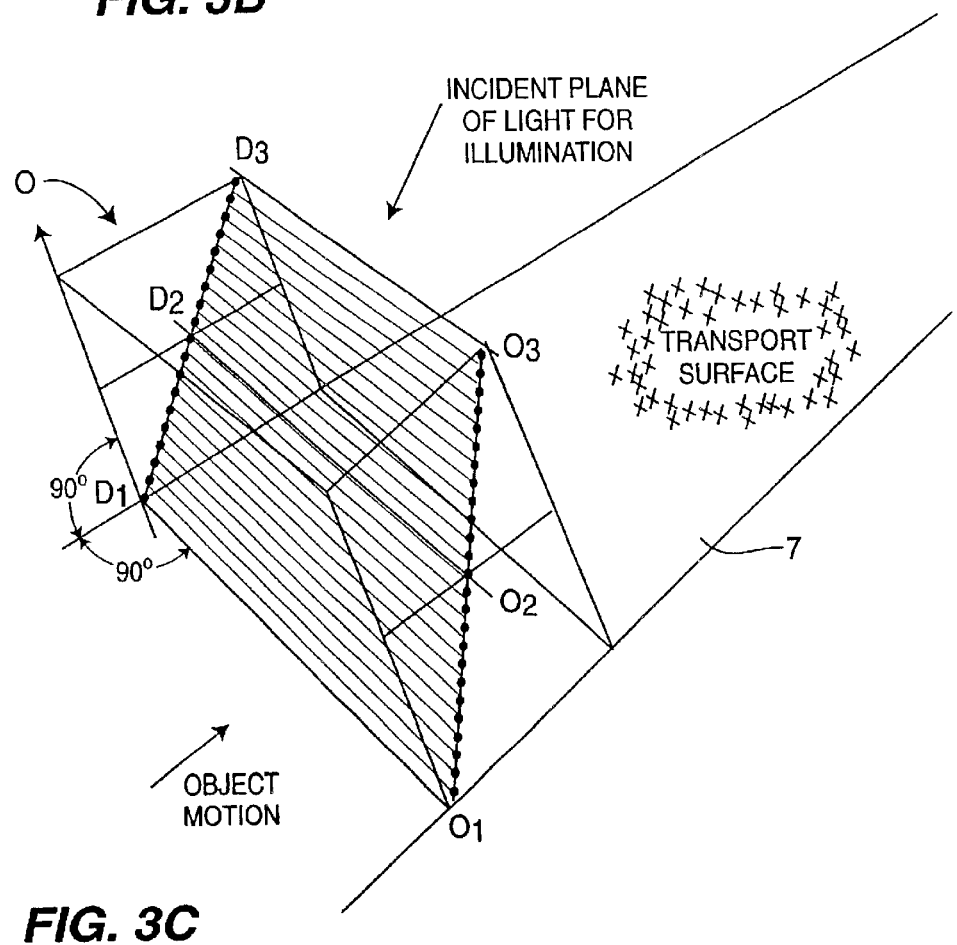
FIG. 3C shows the object plane of FIG. 3B in greater detail.

Referring to FIG. 3B, the spatial relationship between the object plane O, the optics 31 and the image plane I is shown. FIG. 3C shows the object plane O of FIG. 3B in greater detail. FIG. 3D shows the image plane I of FIG. 3B in greater detail.

As shown in FIGS. 3C and 3D, an object $O_1$ in the object plane O at distance $D_1$ from the optics 31 will be in focus in the image plane I on the randomly addressable CMOS area array sensor 16 at the string of pixels $I_1$. Likewise, an object $O_2$ in the object plane O at distance $D_2$ will be in focus in the image plane I at the string of pixels $I_2$, and an object $O_3$ in the object plane O at distance $D_3$ will be in focus in the image plane I at the string of pixels $I_3$. Accordingly, for any plane parallel to the surface of the transport system 7 in the object plane O within the DOF, a corresponding string of pixels on the randomly addressable CMOS area array sensor 16 will be in focus. From the distance (i.e. $D_1$, $D_2$, $D_3$ or height x of a package), the row $26_a$–$26_n$ associated with the height x may be calculated and the corresponding string of pixels which is in focus in the image plane I can be determined. For this embodiment, since the light curtain 15 detects a single constant height (per time sample) of the object 8, (i.e. it does not detect the profile of the object 8), data is read out of the CMOS area array sensor 16 as a complete row 26$_a$–26$_n$. The data from the string of pixels is selected by the processor 32 and read out to the output means 34 for further processing decoding, storage or display as is well known by those skilled in the art. It should be noted that new data is periodically read out of the CMOS area array sensor 16 as will be described in greater detail hereinafter.

Figure 4:
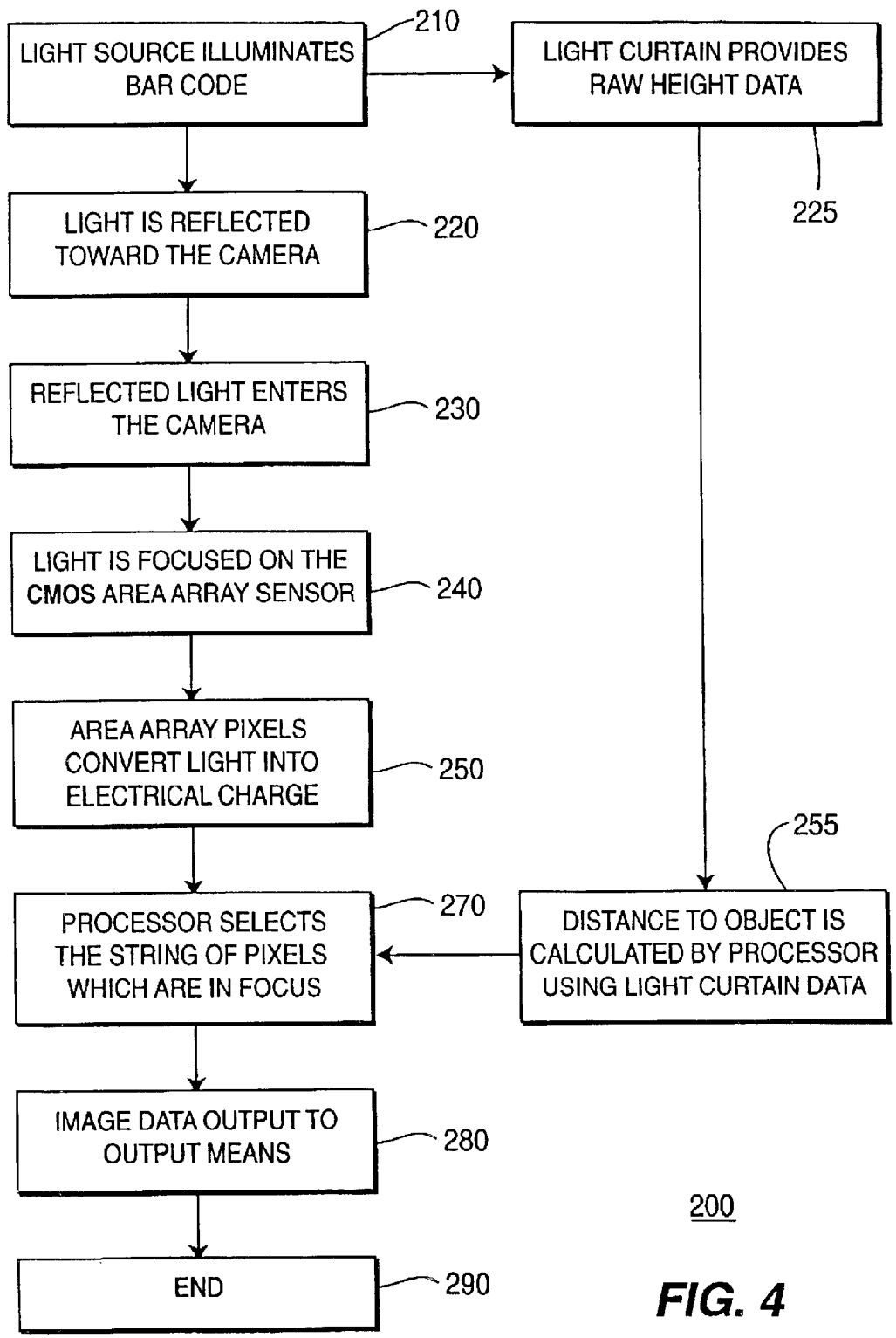
FIG. 4 is a flow diagram of the method of the present invention.

In operation, the scanning system 10 executes the bar code symbol reading and decoding procedure 200 shown in FIG. 4. A light source 12 illuminates a subject bar code symbol 18 (step 210). Light is reflected from the bar code symbol 18 toward the camera 17 (step 220). The reflected light enters the camera 17 via the focusing optics 31 (step 230). The focusing optics 31 focus the light 29 onto the CMOS area array sensor 16 (step 240). Each pixel within the CMOS area array sensor 16 converts the light into an electrical signal (step 250).

As will be explained in greater detail, the calculated distance to the object 8, derived from the output of the light curtain 15, is used to determine the pixels within the CMOS area array sensor 16 which are in focus. In the preferred embodiment, the pixels are a string of pixels in a single row 26$_a$–26$_n$. Although in alternative embodiments described hereinafter, the pixels need not comprise a string of pixels in a single row 26$_a$–26$_n$. The light curtain 15 provides the raw height data (step 225). The distance to the object 8 is then calculated by the processor 32 (step 255) using the light curtain data, which then selects the string of pixels which is in focus (step 270).

The information in the CMOS area array sensor 16 is read out at a periodic rate. This periodic rate is determined by processor 32 using speed information of the object 8, (preferable determined by the tachometer 19), and the desired sample density. This image data is then forwarded to the output means 34 for decoding, storage or display (step 280) using methods that are well known to those of skill in the art.

An alternative embodiment 200 of the present invention is shown in FIG. 5A. This embodiment utilizes a dimensioning system 210 that makes a calculation of the surface contour of the object 208 prior to scanning. The dimensioning system 210 replaces the light curtain 15 or its equivalent. For purposes of this embodiment, the dimensioning system disclosed in U.S. Pat. No. 5,661,561 is used, but as those skilled in the art should know there are many systems which act as dimensioning systems to determine the profile of an object and can provide the necessary input to the processor 32.

Referring to FIG. 5A, the dimensioning system 210 provides a profile of the object 208 on the transport system 223. This profile is provided periodically to the processor 32, at the desired periodic rate. Since the CMOS area array sensor 16 has a plurality of columns 28$_a$–28$_n$, the width of the transport system 223 is segmented into a corresponding plurality of segments; one segment for each column 28$_a$–28$_n$ of the CMOS area array sensor 16. As the object 208 passes the dimensioning system 210, an object profile is obtained. The profile is used to determine a height position (row 26$_a$–26$_n$) for each segment (column 28$_a$–28$_n$) across the width of the transport system 223. The height position is used to calculate a distance from the surface profile of the object 208 within that segment to the camera 230. This string of pixels derived from the profile information is created by selecting an appropriate pixel, written each row 26$_a$–26$_n$ based upon the distance for each column 28$_a$–28$_n$.

Accordingly, one pixel is selected by the processor 32 for each segment across the width of the transport system 223, based upon the height of the object 8 within that segment.

Since the pixels of the CMOS area array sensor 16 are individually addressable, the information in the selected pixels is read out of the CMOS area array sensor 16 using the processor 32, which reads the pixels and forwards the information in the selected pixels to the output means 34 for decoding, storage or display. It should be recognized by those of skill in the art that, in contrast to the embodiment described with reference to FIG. 1, the pixels read out to the processor 32 need not comprise pixels from a single row 28$_a$–28$_n$. In this embodiment, since the dimensioning system 210 provides a profile of the object 208, the profile information is used to determine a specific pixel within each column 28$_a$–28$_n$ which will be in focus. (Of course, a tolerance level may be determined whereby several pixels in the rows adjust to the "in focus" pixel may also be read out to improve accuracy).

It should be noted in this embodiment that the surface contour is preferably quantized to the number of rows 26$_a$–26$_n$ and columns 28$_a$–28$_n$, of the CMOS area array sensor 16; whereby the rows 26$_a$–26$_n$ provide depth (or distance) information and the columns 28$_a$–28$_n$ provide width information. Thus, a single pixel of a single row 26$_a$–26$_n$ will be selected in each column. The pixels that are read out for each time sample will contain one pixel for each column 28$_a$–28$_n$ in the CMOS area array sensor 16. Finally, it should be noted that the light source 212 used with this embodiment of the invention may be structured or non-structured.

The use of more accurate segmented height values as an input to the processor 32 eliminates the inflexibility associated with light curtains for multiple objects or contoured surfaces. It should also be noted that the addressability of the rows 26$_a$–26$_n$ and columns 28$_a$–28$_n$ is interchangeable. Accordingly, those sections of the specification which refer specifically to the functionality of a row 26$_a$–26$_n$, should be understood to refer to the same functionality in a column 28$_a$–28$_n$, and vice versa.

Figure 5B:
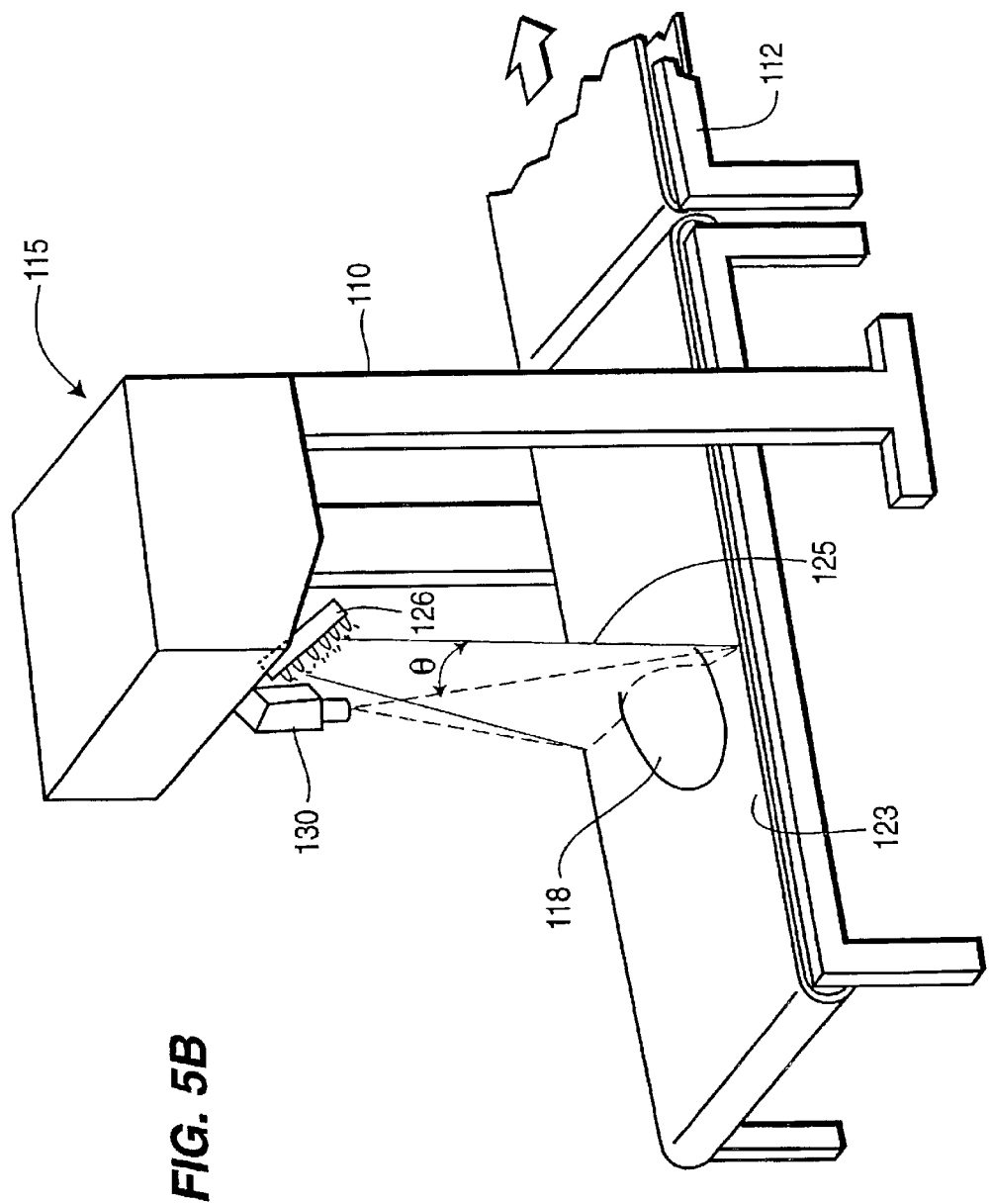
FIG. 5B is another alternative embodiment of the coded symbology scanning system of the present invention that does not require a separate height detection means.

Another alternative embodiment of the present invention will be described with reference to FIG. 5B. This system 115 includes a profile detection-based camera 130 which does not require the use of a separate height detector as required by the prior two embodiments. The system comprises a structured light source 126, a CMOS area array sensor-based camera 130 and a transport system 123, (including a tachometer or other speed detection means (not shown)). As should be known by those skilled in the art, the structured light source 126 may comprise a bank of LEDs, a set of laser diodes or any such equivalent which creates a plane of structured light. The structured light source 126 is aligned to be co-planar with the points in the object plane O that are in focus, as determined by the positioning of the CMOS area array sensor 16 at the Scheimpflug angle in the image plane I.

This embodiment differs from the prior embodiments in that the in-focus pixel information to be read out is determined automatically, either in hardware or in software, by detecting the brightest pixel in each column 28$_a$–28$_n$. If the detection is performed in hardware, a customized CMOS area array sensor 16 which includes intensity detection circuitry to detect the pixels with the greatest amount of incident light, (or highest value) in each column 28$_a$–28$_n$ is used. If the detection is performed in the software, the processor 32 will determine the pixels, or several adjacent pixels, within each column 28$_a$–28$_n$ having the greatest value. The information in these pixels is representative of an object as located by the in-focus profile. The pixels in each row $28_a$–$28_n$ are monitored and the amount of light detected is used to identify the centroid of pixels having the greatest value, (corresponding to the most incident return light). In order to account for any error, for each column position $28_a$–$28_n$ the processor 32 will also extract ± several pixels from the rows $26_a$–$26_n$ adjacent to the pixel having the greatest value.

Figure 5C:
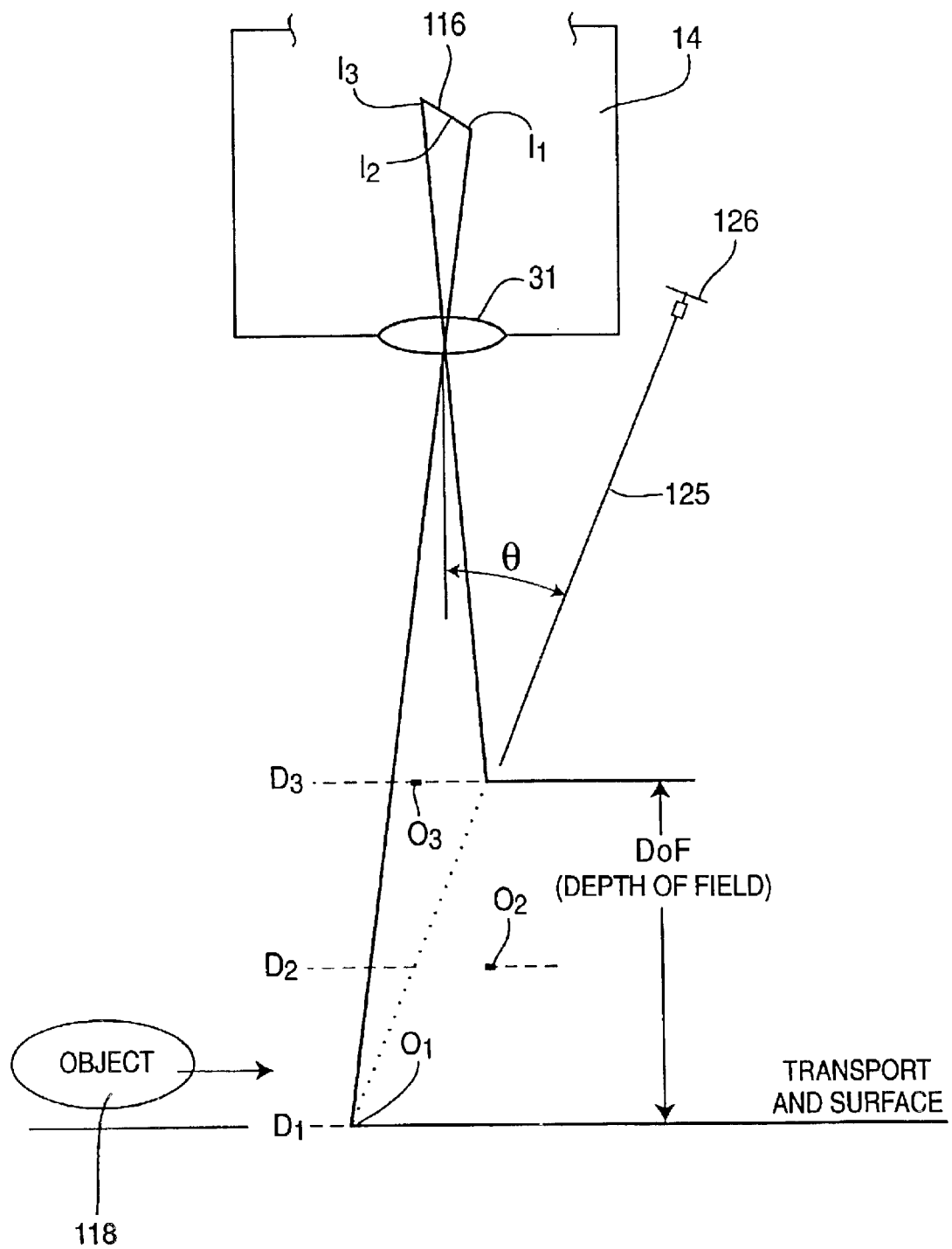
FIG. 5C shows the light plane being projected upon those portions of the object plane O which are in focus.

As shown in FIG. 5C, the structured light source 126 is mounted off-axis at an angle O in relation to the camera 130. The structured light source creates a light plane 125 which is projected onto the transport system 123. The light plane 125 is aligned at the angle O such that it is co-planar with the in-focus rows $26_a$–$26_n$ of the CMOS area array sensor in the image plane I. Accordingly, the light plane 125 only illuminates these portions of the object plane O which are in focus. As a result, the brightest pixels will be the pixels that are in focus. Of course, a separate such image is taken for each time slice.

In essence, the system will detect a "peak" or centroid of higher values, representing higher intensity light, as indicated by one or more pixels in a particular row $26_a$–$26_n$ or column $28_a$–$28_n$. It is the information from these pixels that is read out and further processed. It should be understood by those skilled in the art that since the profile information by definition represents data that is in focus and at a known distance, this embodiment does not require any type of height detection input or means.

As shown in FIG. 6, the light plane 125 strikes the surface of the object 118 and creates a profile of the object 118, which is as shown in FIG. 7. Accordingly, the image plane I will contain a like image of the object 118. As shown in FIG. 7, a cross-sectional profile of the object 118 is generated in the image plane I.

FIG. 8 illustrates the in-focus cross-sectional profile of the object 118 as it is detected by the CMOS area array sensor 16 in the image plane I using a properly aligned structured light source. The image plane I is also the surface of the CMOS area array sensor 16. Upon detection of the incident light, and hence the object 118, the information collected by the CMOS area array sensor 16 is then examined. Since the illuminated profile of the object 118, by definition, comprises those points in the object plane O which are in focus, only those pixels need to be further examined.

Those skilled in the art should realize that this embodiment may also be utilized for object dimensioning. Along with the ability to determine the cross-sectional height profile of an object, this embodiment also provides the information needed to calculate the length and width of the object.

As disclosed above, the present invention has the ability to accurately image multiple side-by-side cartons of varying height being transported on a conveyor system, and to accurately image odd package surfaces such as round and triangle tubes intermixed side-by-side with rectangular cartons. This invention has the ability to accurately image any complex surface contour, limited only by the quantization limits as defined by the resolution of the CMOS area array sensor 16.

While specific embodiments of the present invention have been shown and described, many modifications and variations could be made by one skilled in the art without departing from the spirit and scope of the invention. For example, although a stationary scanner has been utilized in the above embodiments, the embodiments and principles described herein may also be applied to mobile or hand-held scanners. The above description serves to illustrate and not limit the particular form in any way.

What is claimed is:

1. A system for imaging an object, comprising: an image sensor comprising an array of light sensitive elements for detecting incident light, fixed focusing optics, for focusing light reflected from the object onto the image sensor, a height sensor or distance detector for detecting the height of the object and/or distance from the image sensor and providing a height or distance output, and a processor, for selectively reading information from said image sensor based upon said height or distance output, the fixed focusing optics comprise an objective lens, and the image sensor itself is positioned at the Scheimpflug angle with respect to the fixed focusing optics such that the objective lens focuses the object image directly on the image sensor, said light sensitive elements are individually addressable, and whereby said processor reads information from said image sensor by selectively addressing said light sensitive elements.

2. The system of claim 1, characterized in that said light sensitive elements are grouped in a plurality of predetermined groups, and said processor equates said height output with one of said plurality of predetermined groups.

3. The system according to claim 1, characterized in that the image sensor converts the reflected light into a plurality of electrical signals, and the processor selectively reeds the plurality of electrical signals based upon the output from the height or distance detector and decodes information in order to read a coded symbology.

4. A method for scanning a coded symbology on an object, comprising: illuminating the object with a light source; detecting light reflected from the object with an image sensor having an array of addressable sensors that can be selectively addressed based upon an object height or a distance from the image sensor; converting the reflected light into a plurality of values and reading the values with a processor; locating the image sensor (16) at the Scheimpflug angle with respect to a fixed objective lens (31) for focusing the light reflected from the object (8) directly on the image sensor (16) in order to read the coded symbology; and reading out information from the image sensor (16) at a periodic rate based on a speed of the object (8).

5. A system for dimensioning an object comprising:

an illumination source for illuminating the object;

a light detector for detecting light reflected from the object, the light detector comprising an array of light detecting elements in a plurality of rows and columns, each element for converting the light incidant thereon into an electrical signal; and a processor for selectively reading said electrical signals; whereby said processor determines, for each column, the light detecting element which has detected the most incident light and reads out only that element for each column.

6. The system of claim 5, whereby said illumination source is a structured light source which illuminates the object with a plane of structured light.

7. A method for detecting a coded symbology on an object comprising:

illuminating an object;

detecting light reflected from the object using a light detector having a plurality of light sensitive elements in a plurality of columns which convert light into an electrical signal; and selectively reading said electrical signals such that the pixel having the highest amount of detected light for each column is further processed.

8. A system for dimensioning an object comprising:

an illumination source for illuminating the object;

a detector far detecting light reflected from the object, the detector comprising a plurality of light detecting elements in predefined groups, each element for converting the detected light into an electrical signal; and a processor for selectively reading said electrical signals; whereby said processor determines said group having the greatest amount of incident light, and reads out only the electrical signals for that group.

9. The system of claim 8, whereby said illumination source is a structured light source which illuminates the object with a plane of structured light.

10. A method for detecting a coded symbology comprising:

(a) illuminating the coded symbology;

(b) detecting light reflected from the coded symbology using a plurality of light sensitive elements, each of which convert light into an electrical signal; and (c) selectively reading said electrical signals such that only the electrical signals having the highest magnitude are further processed.

11. The method of claim 10, wherein the plurality of light sensitive elements are selectively positioned at the Scheimpflug angle.

12. The method of claim 10, whereby steps a, b and c are repeated at predetermined intervals.

* * * * *

UNITED STATES PATENT AND TRADEMARK OFFICE
CERTIFICATE OF CORRECTION

PATENT NO. : 6,783,068 B2
DATED : August 31, 2004
INVENTOR(S) : Kurt Hecht

It is certified that error appears in the above-identified patent and that said Letters Patent is hereby corrected as shown below:

<u>Column 8,</u>
Line 27, after the word "selectively", delete "reeds" and insert therefor -- reads --.
Line 50, after the word "light", delete "incidant" and insert therefor -- incident --.

<u>Column 9,</u>
Line 6, after the word "detector", delete "far" and insert therefor -- for --.

Signed and Sealed this

Thirtieth Day of November, 2004

JON W. DUDAS
*Director of the United States Patent and Trademark Office*